No. 633,681. Patented Sept. 26, 1899.
F. M. CADMAN & J. W. JOHNSON.
LAP ROBE HOLDER.
(Application filed July 15, 1899.)
(No Model.) 2 Sheets—Sheet 1.

Witnesses
F. L. Durand
[signature]

Inventors
Frank M. Cadman
John W. Johnson
by H. B. Willson & Co.
Attorneys

THE NORRIS PETERS CO., PHOTO-LITHO., WASHINGTON, D. C.

No. 633,681. Patented Sept. 26, 1899.
F. M. CADMAN & J. W. JOHNSON.
LAP ROBE HOLDER.
(Application filed July 15, 1899.)

(No Model.) 2 Sheets—Sheet 2.

Witnesses
F. L. Ourand

Inventors
Frank M. Cadman
John W. Johnson
by H. B. Willson & Co.
Attorneys

THE NORRIS PETERS CO., PHOTO-LITHO., WASHINGTON, D. C.

UNITED STATES PATENT OFFICE.

FRANK M. CADMAN AND JOHN W. JOHNSON, OF SOLDIER, KANSAS.

LAP-ROBE HOLDER.

SPECIFICATION forming part of Letters Patent No. 633,681, dated September 26, 1899.

Application filed July 15, 1899. Serial No. 723,942. (No model.)

*To all whom it may concern:*

Be it known that we, FRANK M. CADMAN and JOHN W. JOHNSON, citizens of the United States, residing at Soldier, in the county of Jackson and State of Kansas, have invented certain new and useful Improvements in Lap-Robe Holders; and we do declare the following to be a full, clear, and exact description of the invention, such as will enable others skilled in the art to which it appertains to make and use the same.

The invention has relation to lap-robe holders.

The object of the invention is to provide a lap-robe holder which may be readily attached to a vehicle and which will securely retain the lap-robe in position; furthermore, to provide a device of this character which may be adjusted to the boxes of vehicles of different widths as well as be adjusted to accommodate persons of different sizes, and, finally, to provide a device of this character which shall be simple of construction, durable in use, and comparatively inexpensive of production and easily and quickly operated.

With these objects in view the invention consists in certain features of construction and combination of parts, which will be hereinafter fully described and claimed.

Figure 1:
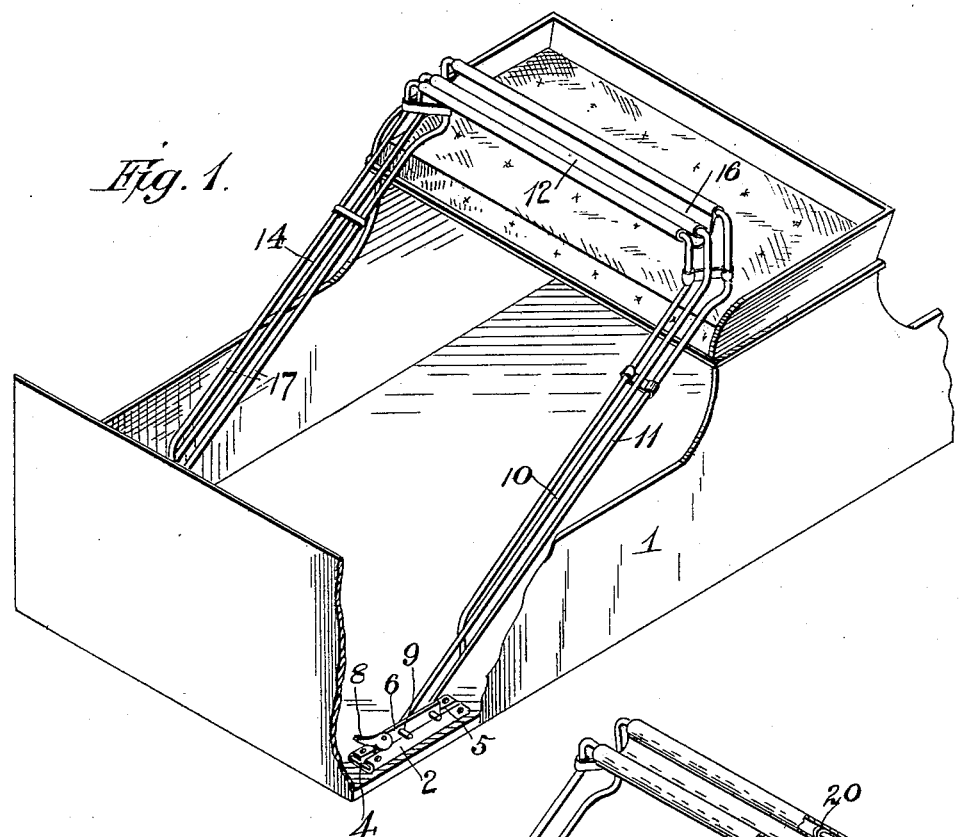
Figure 6:
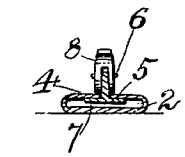
Figure 5:
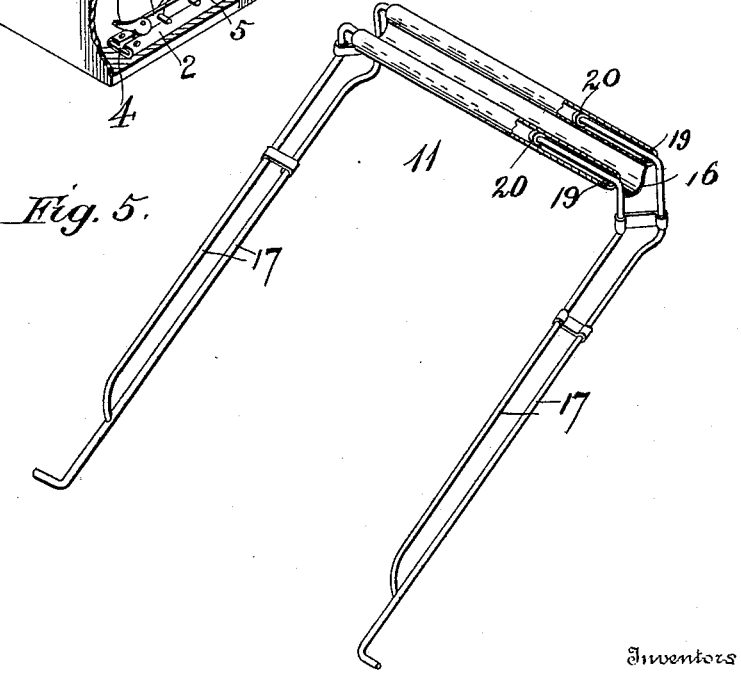
Figure 2:
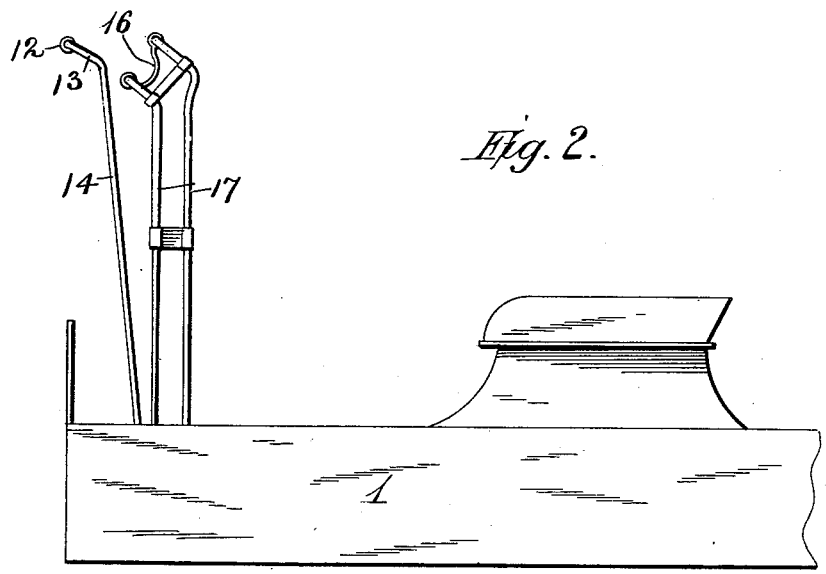
Figure 3:
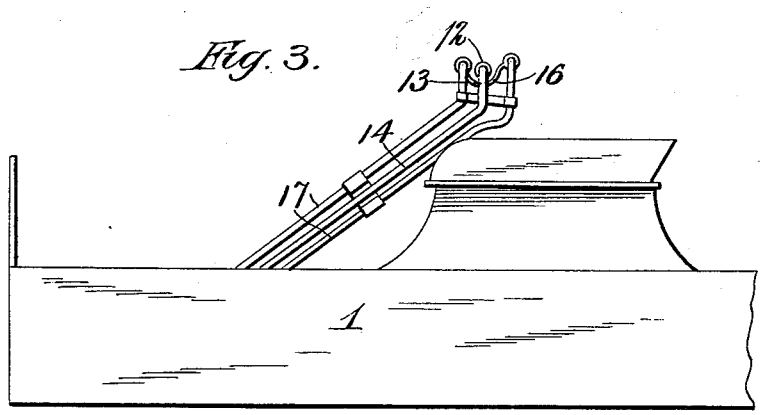
Figure 4:
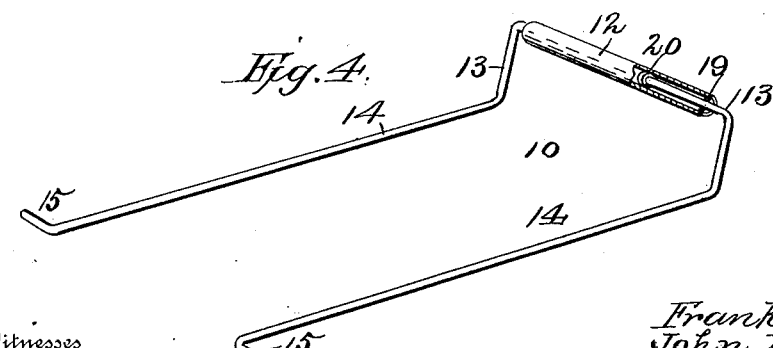

In the accompanying drawings, Figure 1 is a view of the front portion of the box or body of a vehicle, the dashboard being broken away near one end to more clearly illustrate the construction of one of the brackets. Fig. 2 is a side elevation with the lap-robe holder elevated in position to receive the lap-robe. Fig. 3 is a similar view with the lap-robe holder depressed and in the position it assumes when clamping the lap-robe. Fig. 4 is a detail perspective view of the upper jaw of the robe-holder, portions being broken away to show the telescopic joint. Fig. 5 is a similar view of the lower jaw, portions being broken away. Fig. 6 is a cross-sectional view through one of the brackets.

In the drawings the same reference characters indicate the same parts of the invention.

1 denotes the body or box of the vehicle. At the forward end and at the sides thereof are secured brackets 2. Each one of these brackets consists of a plate 3, having inwardly-bent guide-flanges 4, leaving an intervening slit 5 between the edges thereof, a web 6, having lateral flanges 7, and a clamping-cam 8 for locking the web in longitudinal adjustment in the plate. The plate is also provided with a longitudinal row of apertures 9.

10 and 11 denote the upper and lower jaws, respectively. The upper jaw consists of a tube or sleeve 12, into which loosely project and are permitted to slide the upwardly and inwardly projecting ends 13 of the rods 14. The lower forward ends of these rods 14 are provided with trunnions or lateral extensions 15, which are journaled in the forward apertures of the brackets. The lower jaw comprises a plate 16, U-shaped in cross-section and provided with sleeves or tubes at its edges. These sleeves or tubes receive the upwardly and inwardly projecting ends of the rods 17, which are suitably secured together and have their lower ends formed with trunnions to engage the rear set of apertures in the bracket-plate. The end of each tube or sleeve is provided with a ferrule 19, while the inner opposing ends of the rods are provided with stop-shoulders 20 to prevent, in the lateral adjustment of the rods, the accidental disconnection of the rods with the tubes.

In use when it is desired to attach the lap-robe the parts are elevated to the position shown in Fig. 2, in which position one end of the lap-robe is placed in the U-shaped plate. The upper jaw is now swung down into engagement with the U-shaped plate and between the tubes or sleeves at the edges thereof. The entire device is now swung downward, and owing to the pivotal connection of the clamping member 10 in advance of the clamping member 11, whereby the two jaws travel in different arcs of a circle, the robe will be securely clamped between the jaws and be prevented from falling down and uncovering the limbs of the occupant of the vehicle.

This device may be easily attached to vehicles of different widths, for the reason that its breadth may be varied on account of the telescopic connection of the jaws, and to adapt the device to persons of different sizes the cams of the bracket may be moved to permit of the webs being slid either forward or rearward, as may be desired, and when adjusted the cams are again depressed and will hold the device in the desired position.

It will be noticed that the rods of the clamping-jaws 11 are arranged one above the other and one within the other, so that when the upper clamping-jaw is forced down over the robe it not only holds the robe at its upper end, but also along its sides, and thereby prevents wind and dust from forcing their way under the sides of the robe.

It will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

1. In a lap-robe holder, the combination with the upper and lower clamping-jaws, provided with forwardly-projecting rods pivoted to swing in different arcs of a circle, substantially as and for the purpose set forth.

2. In a lap-robe holder, the combination with the clamping-jaws, of a set of rods for each jaw, said rods telescoping within said jaws and having their free ends pivoted at different points, whereby the jaws swing in different arcs of a circle, substantially as and for the purpose set forth.

3. In a lap-robe holder, the combination with the clamping-jaws provided with forwardly and downwardly extending rods, brackets adapted to be secured to the bottom of a vehicle-body, said rods journaled in said brackets, and means for adjusting the brackets longitudinally of the body, substantially as and for the purpose set forth.

4. In a lap-robe holder, the combination with two jaws, one of which consists of a U-shaped plate formed on its edges with sleeves or tubes, rods spaced apart and having their rear ends bent inwardly and projecting within said tubes or sleeves and their lower ends pivoted to the vehicle-body; the other jaw consisting of a tube, and rods having their upper ends bent inwardly and projecting into said tubes and their lower ends pivoted to the vehicle-body at a point in advance of the rods of the lower jaw, substantially as and for the purpose set forth.

In testimony whereof we have hereunto set our hands in presence of two subscribing witnesses.

FRANK M. CADMAN.
JOHN W. JOHNSON.

Witnesses:
J. W. FLEMING,
J. T. HOLSTON.